(12) United States Patent
Mayster

(10) Patent No.: US 11,867,519 B2
(45) Date of Patent: Jan. 9, 2024

(54) WEATHER AND ROAD SURFACE TYPE-BASED NAVIGATION DIRECTIONS

(71) Applicant: GOOGLE LLC, Mountain View, CA (US)

(72) Inventor: Yan Mayster, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 17/047,648

(22) PCT Filed: Oct. 15, 2019

(86) PCT No.: PCT/US2019/056194
§ 371 (c)(1),
(2) Date: Oct. 14, 2020

(87) PCT Pub. No.: WO2021/076099
PCT Pub. Date: Apr. 22, 2021

(65) Prior Publication Data
US 2023/0127182 A1 Apr. 27, 2023

(51) Int. Cl.
*G01C 21/34* (2006.01)
*G06V 20/10* (2022.01)
(Continued)

(52) U.S. Cl.
CPC ..... *G01C 21/3453* (2013.01); *G01C 21/3667* (2013.01); *G06V 10/774* (2022.01); *G06V 20/182* (2022.01)

(58) Field of Classification Search
CPC ............ G01C 21/3453; G01C 21/3667; G01C 21/3415; G01C 21/3461; G01C 21/34;
(Continued)

(56) References Cited

U.S. PATENT DOCUMENTS 6,553,308 B1 4/2003 Uhlmann et al.
9,623,905 B2 4/2017 Shashua et al.
(Continued)

FOREIGN PATENT DOCUMENTS

EP 2 291 608 B1 12/2012
EP 3 054 400 A1 8/2016
(Continued)

OTHER PUBLICATIONS

International Seach Report and Written Opinion for Application No. PCT/US2019/056194, dated Aug. 31, 2020.
(Continued)

*Primary Examiner* — Calvin Cheung
(74) *Attorney, Agent, or Firm* — MARSHALL, GERSTEIN & BORUN LLP

(57) ABSTRACT

To provide navigation directions according to road surface types of road segments, a request for navigation directions from a starting location to a destination location is received. A set of candidate routes for navigating from the starting location to the destination location is identified. Then for each road segment within each candidate route, a road surface type for the road segment is determined. A route is selected from the set of candidate routes based at least in part on the road surface types of the road segments within the route. A set of navigation directions is provided for presentation on a client device for navigating from the starting location to the destination location via the selected route.

14 Claims, 8 Drawing Sheets

(51) Int. Cl.
*G06V 10/774* (2022.01)
*G01C 21/36* (2006.01)

(58) Field of Classification Search
CPC ............ G01C 21/3691; G01C 21/3697; G06V 10/774; G06V 20/182
See application file for complete search history.

(56) References Cited

U.S. PATENT DOCUMENTS

| | | | |
|---|---|---|---|
| 10,119,827 B2* | 11/2018 | Rander | G01C 21/3453 |
| 2007/0208504 A1 | 9/2007 | Lee | |
| 2010/0036599 A1 | 2/2010 | Froeberg et al. | |
| 2012/0136567 A1 | 5/2012 | Wang et al. | |
| 2013/0169794 A1* | 7/2013 | Shimomura | G01C 7/04 |
| | | | 348/128 |
| 2014/0071240 A1 | 3/2014 | Chen et al. | |
| 2014/0347448 A1* | 11/2014 | Hegemann | G06T 7/90 |
| | | | 348/46 |
| 2015/0224925 A1* | 8/2015 | Hartmann | B60W 40/068 |
| | | | 348/148 |
| 2016/0042644 A1* | 2/2016 | Velusamy | G08G 1/096775 |
| | | | 340/435 |
| 2017/0263120 A1* | 9/2017 | Durie, Jr. | G08G 1/205 |
| 2017/0353834 A1* | 12/2017 | Yang | G06V 20/52 |
| 2018/0194286 A1* | 7/2018 | Stein | B60W 10/22 |

FOREIGN PATENT DOCUMENTS

| | | |
|---|---|---|
| EP | 2 713 309 B1 | 2/2019 |
| WO | WO-2007/088859 A1 | 8/2007 |
| WO | WO-2015/140966 A1 | 9/2015 |
| WO | WO-2016/135561 A1 | 9/2016 |
| WO | WO-2017/176550 A1 | 10/2017 |

OTHER PUBLICATIONS

Kurviger, "Planning a curvy motorcycle trip with Kurviger," (2019). Retrieved from the Internet at: URL:https://kurviger.de/about/en.
Wazeopedia, "User:Subs5/Unpaved," (2009-2020). Retrieved from the Internet at: URL:https://wazeopedia.waze.com/wiki/USA/User:Subs5/Unpaved.

* cited by examiner

WEATHER AND ROAD SURFACE TYPE-BASED NAVIGATION DIRECTIONS

FIELD OF THE DISCLOSURE

The present disclosure relates to digital mapping data and, more particularly, to selecting navigation routes for guiding a user based on road surface types and/or weather conditions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications executing in computers, smartphones, embedded devices, etc., generate step-by-step navigation directions in response to receiving input from a user, specifying the starting point and the destination. The navigation directions are typically generated for a route which guides the user to the destination in the shortest amount of time.

SUMMARY

In addition to selecting a route having the shortest estimated time period, safety concerns as well as potential wear and tear on a vehicle may be taken into consideration. To address these safety concerns, a road surface type routing engine in a server device identifies road surface types of road segments as well as weather conditions in the area. The road surface type routing engine may then alert the user of an upcoming road segment within a route having a road surface type and/or weather conditions which may be dangerous to the user or which may cause the user's vehicle to experience wear and tear. Additionally, the road surface type routing engine may select an alternative route which does not include road segments having road surface types and/or weather conditions which may be dangerous to the user. For example, to address safety concerns regarding weather conditions and road types, the road surface type routing engine may select a route that has a slightly longer estimated time period but decreases the likelihood of the user's vehicle getting stuck in the mud or of experiencing damage to the vehicle or harm to the user. In one instance, the road surface type routing engine may select a first route which includes a smooth road surface but is expected to take longer than a second route which includes a bumpy and muddy road surface. In some implementations, the user may select a setting on a navigation application indicating that the user prefers safer routes or routes that avoid a particular type of road surface type and/or weather conditions (e.g., dirt roads in the rain) over routes with the shortest estimated duration.

More specifically, the road surface type routing engine receives a request for navigation directions from a starting location to a destination location from a user of a client device. The road surface type routing engine obtains road surface type data for a geographic area that includes the starting location and the destination location. Additionally, the road surface type routing engine identifies a set of candidate routes for navigating from the starting location to the destination location. The candidate routes may include several road segments, and the road surface type routing engine may obtain an estimated time period for traversing each candidate route and/or each road segment on each candidate route. For example, the road surface type routing engine may obtain a set of candidate routes and estimated time periods for traversing the candidate routes from a navigation server. For each candidate route, the road surface type routing engine identifies the road surface type of each road segment within the candidate route.

Then the road surface type routing engine assigns a score to each candidate route based on the road surface types of the road segments and the estimated time periods for traversing the road segments. In some implementations, the road surface type routing engine obtains current weather conditions for the geographic area that includes the starting location and the destination location and/or weather conditions over a particular time interval (e.g., the previous week, the previous N days, etc.). The score assigned to each candidate route may also be based on the current weather conditions or weather conditions over the particular time interval in the geographic area.

More specifically, for each road segment, the road surface type routing engine may assign a time score to the road segment based on the estimated time period for traversing the road segment. The time score may be proportional to the estimated time period for traversing the road segment, such that shorter estimated time periods have lower scores. The road surface type routing engine may also assign a road surface type score to the road segment based on the road surface type of the road segment. Paved road segments such as asphalt or concrete may be assigned lower scores than unpaved road segments, such as dirt, gravel, and grass. Additionally, asphalt or concrete roads segments may be assigned lower scores than cobblestone or brick road segments. Moreover, the road surface type routing engine may assign a weather score to the road segment based on current or recent weather conditions in the geographic area. The weather score may also take into account the road surface type. For example, a dirt road in an area which recently experienced rain may be assigned a lower score than a concrete road in an area which recently experienced rain. In another example, during strong winds a gravel road may be assigned a lower score than an asphalt road. In yet another example, after a threshold amount of precipitation or flooding a concrete road may be assigned a lower score than a bridge underpass. Still further, the road surface type routing engine may assign a scarcity score to the road segment based on the scarcity of the road surface type of the road segment within the geographic area. For example, if the road segment is a dirt road but a large percentage of each of the road segments in the geographic area are dirt roads, the scarcity score may be lower than for a road segment which is a dirt road in an area where the road segment is the only dirt road in the geographic area. The road surface type routing engine may then aggregate or combine the scores for the road segment in any suitable manner to generate an overall score for the road segment. The road surface type routing engine may also aggregate or combine the overall scores for the road segments in any suitable manner to generate an overall score for the candidate route.

Then the road surface type routing engine ranks the candidate routes according to their overall scores and selects the candidate route having the lowest overall score as the route to provide to the user. The road surface type routing engine then transmits a set of navigation directions for presentation on the client device for navigating from the starting location to the destination location via the selected route.

In other implementations, the road surface type routing engine provides indications of each of the candidate routes to the client device in a ranked order according to the respective overall scores. In this manner, the user may select one of the candidate routes for navigating to the destination location. The road surface type engine may provide alerts to the client device for candidate routes or a selected route having particular road surface types, such as unpaved roads or having road segments with overall scores below a threshold score.

In some implementations, the road surface type routing engine may obtain weather conditions for a road segment as the user approaches the road segment. The road surface type routing engine may then recalculate the overall score for the road segment. If the overall score for the road segment is below a threshold score, the road surface type routing engine may provide an alert to the client device for the road segment. In other scenarios, the road surface type routing engine may generate and provide an alternative route to the client device which avoids the road segment.

In particular, an example embodiment of the techniques of the present disclosure is a method for generating a set of navigation directions according to road surface types of road segments. The method includes receiving a request for navigation directions from a starting location to a destination location, and identifying a set of candidate routes for navigating from the starting location to the destination location. For each road segment within each candidate route in the set of candidate routes, the method further includes determining a road surface type for the road segment, selecting a route from the set of candidate routes based at least in part on the road surface types of the road segments within each candidate route, and providing a set of navigation directions for presentation on a client device for navigating from the starting location to the destination location via the selected route.

Another embodiment of these techniques is a computing device for generating a set of navigation directions according to road surface types of road segments. The computing device includes one or more processors and a non-transitory computer-readable medium storing instructions. When executed by the one or more processors, the instructions cause the computing device to receive a request for navigation directions from a starting location to a destination location, and identify a set of candidate routes for navigating from the starting location to the destination location. For each road segment within each candidate route in the set of candidate routes, the instructions cause the computing device to determine a road surface type for the road segment, select a route from the set of candidate routes based at least in part on the road surface types of the road segments within each candidate route, and provide a set of navigation directions for navigating from the starting location to the destination location via the selected route.

Yet another embodiment of these techniques is client device for presenting a set of navigation directions according to road surface types of road segments. The client device includes a user interface, one or more processors, and a non-transitory computer-readable medium storing instructions. When executed by the one or more processors, the instructions cause the client device to transmit a request for navigation directions from a starting location to a destination location, receive a set of navigation directions for navigating along a route from the starting location to the destination location, the route including a plurality of road segments, receive, for at least one of the plurality of road segments, an alert indicating a road surface type for the at least one road segment, and present, via the user interface, the set of navigation directions and the alert indicating the road surface type for the at least one road segment.

DETAILED DESCRIPTION

Overview

Figure 1:
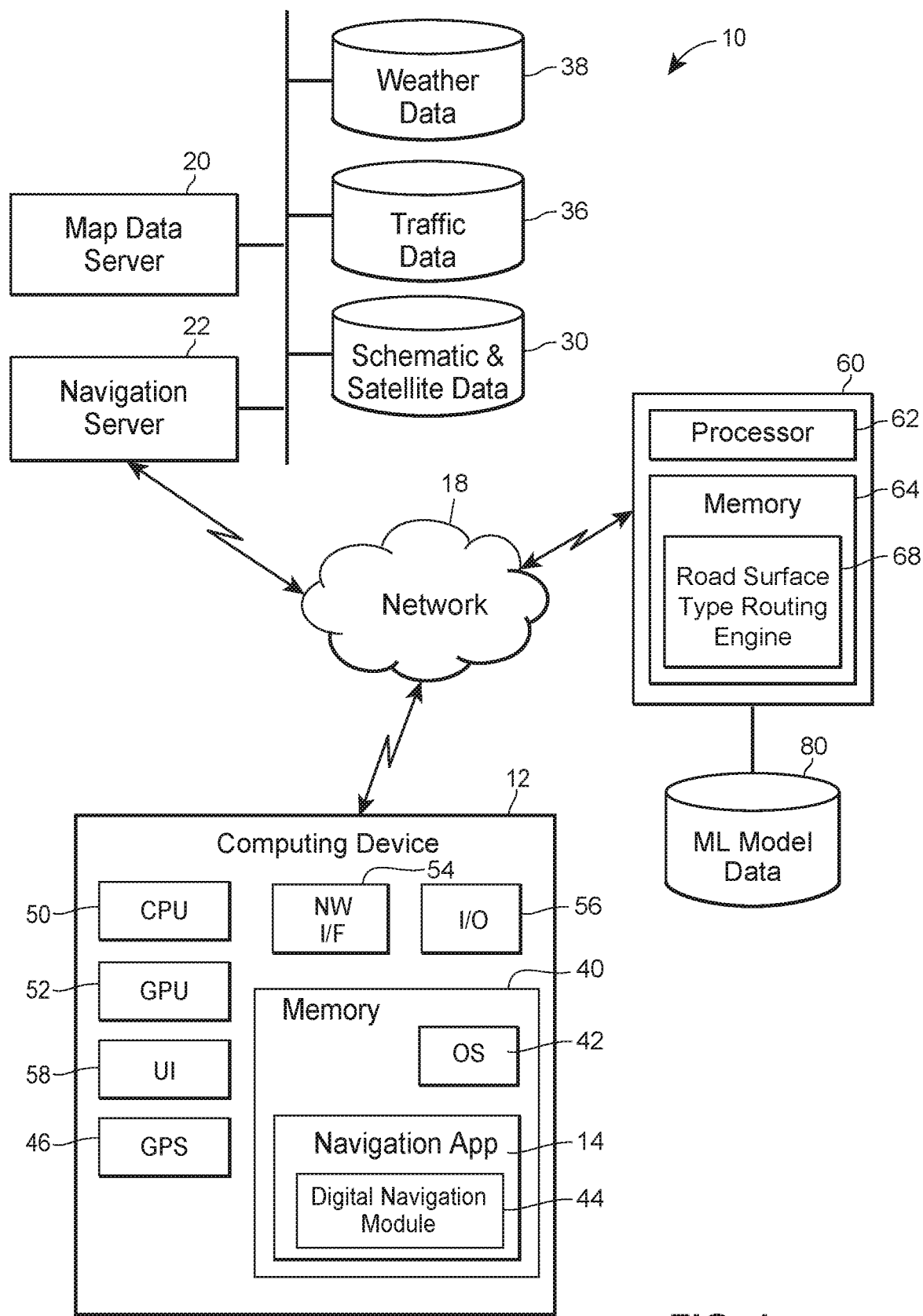
FIG. 1 illustrates a block diagram of an example communication system in which techniques for generating a set of navigation directions according to road surface types of road segments can be implemented.

There are many roads in the world that may be difficult, and even unsafe, to drive under relatively common weather conditions. For example, unpaved dirt roads can easily turn to mud in heavy rain. If a vehicle is directed along a route that is unsuitable at the time the vehicle is travelling along the route, at best this is likely to delay the vehicle, and potentially could be dangerous for the vehicle and its occupants. Generating navigation directions for a vehicle according to the embodiments described herein avoids, or at least reduces, the likelihood that a vehicle is directed along a route that is unsuitable at the time of travel.

More specifically, a particular route from the starting location to the destination location may be suitable in some scenarios but may not be suitable in others—for example a route that includes travel along an unpaved dirt road segment may be unsuitable during a heavy rain but may be suitable for use at other times. In another example, a route that includes travel along a gravel road segment may be unsuitable in high winds but may be suitable for use at other times. In yet another example, a road segment having a bridge underpass or other significant local depression may be particularly prone to flooding, even if the road segment is a paved road segment. In a scenario where the shortest/fastest route from the starting location to the destination location includes such a road segment, directing a vehicle along another route may increase the time and fuel required for the vehicle to travel from the starting location to the destination location. Generating navigation directions for a vehicle according to this embodiment may ensure that a vehicle is directed along the shortest route when appropriate, and is only directed along another, longer route when required (e.g., during or soon after heavy rain in a scenario where the shortest route from the starting location to the destination location includes an unpaved dirt road segment). In other implementations, the user may select from one or several user preferences via one or several user settings in a navigation application. The user may indicate the extent to which the user prefers comfort and convenience compared to the extra time spent driving and/or increased fuel expense. Then a route may be selected based on the user's selected preferences. For example, if the user indicates a slight preference for comfort and convenience, the navigation application may present the more comfortable/convenient route to the user slightly more often than the fastest route. If the user indicates a large preference for comfort and convenience, the navigation application may present the more comfortable/convenient route to the user each time the user requests navigation directions or nearly each time.

In some scenarios, the suitability of a route depends not only on the weather conditions at the time of receiving the request for navigation directions but on the weather conditions in a period leading up to the receipt of the request for navigation directions. For example, a route that includes travel along an unpaved dirt road segment may remain unsuitable for several days after heavy rain. More specifically, weather conditions may be obtained in the geographic area for the N days immediately before receiving the request.

Example Hardware and Software Components

Referring to FIG. 1, an example communication system 10 in which a road surface type routing system can be implemented includes a client computing device 12 (also referred to herein as a "client device") configured to execute a geographic application 14, which also can be referred to as "navigation application 14." Depending on the implementation, the navigation application 14 can display an interactive digital map, request and receive routing data to provide driving, walking, or other navigation directions, provide various geolocated content, etc. The client device 12 may be operated by a user displaying a digital map while navigating to various locations.

In addition to the client device 12, the communication system 10 includes a road surface type routing server 60 configured to provide a selected route for navigating from a starting location to a destination location to the client device 12, where the route is selected based at least in part on the road surface types of the road segments along the route. The road surface type routing server 60 can be communicatively coupled to a database 80 that stores, in an example implementation, machine learning models for identifying road surface types of road segments based on an image of a geographic area that includes the road segments. The database 80 may also store training data for training the machine learning models, such as road surface type templates in various aerial or satellite images. Furthermore, the database 80 may store indications of road surface types for road segments where the road surface type has previously been determined.

More generally, the road surface type routing server 60 can communicate with one or several databases that store any type of suitable geospatial information. The communication system 10 also can include a navigation data server 22 that provides driving, walking, biking, or public transit directions, for example for presentation via the navigation application 14. Further, the communication system 10 can include a map data server 20 that provides map data to the client device 12 for generating a map display. The devices operating in the communication system 10 can be interconnected via a communication network 18.

The map data server 20 and navigation server 22 are coupled to a map database 30 which includes schematic and satellite data storing street and road information, topographic data, satellite imagery, etc. The servers 20, 22 are also coupled to a traffic database 36 which includes current traffic conditions, and also may include road closure data, estimated time data, etc. Furthermore, the servers 20, 22 are coupled to a weather database 38 which includes current weather data in various geographic areas. In general, the navigation server 22 can receive information related to geographic locations from any number of suitable databases, web services, etc. One or more operators can periodically update the databases 30, 36, and 38 where each operator provides updates to the databases 30, 36, and 38 at respective time intervals. For example, the traffic and weather databases 36 and 38 may store substantially real-time data, whereas the schematic and satellite database 30 may be updated relatively infrequently, such as once a week.

The schematic and satellite database 30 can store data in a raster format, a vector format, in any other suitable format or any combination thereof. In some implementations, the data is organized into map tiles at multiple zoom levels to facilitate serving map data to client devices. Depending on the implementation, the navigation server 22 can provide map and directions data to client devices separately or together in map tiles, for example. In other embodiments, the map data and navigation directions may be generated remotely on remote servers separate from the map data server 20 and navigation server 22. Moreover, in some embodiments, the map and navigation directions may be generated by a combination of the map data server 20, the navigation server 22, and any number of additional servers.

In some implementations, the road surface type routing server 60 receives map and directions data from the map data server 20 and/or the navigation server 22 including a set of candidate routes each including a set of road segments for navigating from the starting location to the destination location. The road surface type routing server 60 then analyzes each candidate route in the set of candidate routes based on the estimated time periods for traversing each road segment in the candidate route, for example based on the amount of traffic on each road segment, the road surface types of each road segment, current or recent weather conditions in a geographic area including the road segments in the candidate route, the type of vehicle used for traversing the candidate route, etc. In other implementations, the road surface type routing server 60 communicates directly with the schematic and satellite database 30, the traffic database 26, and the weather database 38 to generate a set of candidate routes from the starting location to the destination location and then select a route from the set of candidate routes to provide to the user for navigating to the destination location.

The client device 12 may be a portable device such as smart phone or a tablet computer, for example. The client device 12 may also be a laptop computer, a desktop computer, a personal digital assistant (PDA), a wearable device such as a smart watch or smart glasses, etc. The client device 12 also can communicate with various content providers, servers, etc. via a wired or wireless communication network 18 such as a fourth- or third-generation cellular network (4G or 3G, respectively). The client device 12 may include a memory 40, one or more processors (CPUs) 50, a graphics processing unit (GPU) 52, a network interface unit 54, an I/O module 56, a user interface (UI) 58 for displaying map data and directions, and a global positioning system (GPS) 46 or another suitable positioning module. The memory 40 can be a non-transitory memory and can include one or several suitable memory modules, such as random access memory (RAM), read-only memory (ROM), flash memory, other types of persistent memory, etc. The I/O module 56 may be a touch screen, for example. In various implementations, the client device 12 can include fewer components than illustrated in FIG. 1 or conversely, additional components.

The memory 40 stores an operating system (OS) 42, which can be any type of suitable mobile or general-purpose operating system. The memory 40 also stores a navigation application 14 which is configured to generate interactive digital maps and/or perform other geographic functions, as indicated above. The navigation application 14 can receive map data in a raster (e.g., bitmap) or non-raster (e.g., vector graphics) format from the map data server 20 and present the map data via the digital navigation module 44. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The navigation application 14 also can display driving, walking, or transit directions, and in general provide functions related to geography, geolocation, navigation, etc. via the digital navigation module 44.

The digital navigation module 44 in the navigation application 14 is configured to transmit a request for navigation directions from a starting location to a destination location, receive a set of navigation directions for navigating along a route to the destination location and alerts indicating road surface types for road segments along the route, and present the set of navigation directions and the alert on the user interface 58.

It is noted that although FIG. 1 illustrates the navigation application 14 as a standalone application, the functionality of the navigation application 14 also can be provided in the form of an online service accessible via a web browser executing on the client device 12, as a plug-in or extension for another software application executing on the client device 12, etc. The navigation application 14 generally can be provided in different versions for different respective operating systems. For example, the maker of the client device 12 can provide a Software Development Kit (SDK) including the navigation application 12 for the Android™ platform, another SDK for the iOS™ platform, etc.

In some implementations, the road surface type routing server 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a road surface type routing engine 68, which can generate a route for navigating from a starting location to a destination location based at least in part on the road surface types of the road segments along the route. The road surface type routing engine 68 can also generate a set of routes each for navigating from the starting location to the destination location and rank the set of routes according to the road surface types of road segments on each route, the estimated time periods for traversing each road segment, for example based on the amount of traffic on each road segment, current or recent weather conditions in a geographic area including the road segments in each route, the type of vehicle used for traversing the routes, etc. Additionally, the road surface type routing engine 68 may provide an indication of the route or the set of routes in a ranked order for display by the digital navigation module 44 of the client device 12.

The road surface type routing engine 68 and the digital navigation module 44 can operate as components of a road surface type routing system. Alternatively, the road surface type routing system can include only server-side components and simply provide the digital navigation module 44 with instructions to display the set(s) of navigation directions for traveling from the starting location to the destination location along the route(s). In other words, road surface type routing techniques in these embodiments can be implemented transparently to the digital navigation module 44. As another alternative, the entire functionality of the road surface type routing engine 68 can be implemented in the digital navigation module 44.

For simplicity, FIG. 1 illustrates the road surface type routing server 60 as only one instance of a server. However, the road surface type routing server 60 according to some implementations includes a group of one or more server devices, each equipped with one or more processors and capable of operating independently of the other server devices. Server devices operating in such a group can process requests from the client device 12 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the digital navigation module 44 operating in the client device 12 receives and transmits data to the road surface type routing server 60. Thus, in one example, the client device 12 may transmit a communication to the road surface type routing engine 68 (implemented in the road surface type routing server 60) requesting navigation directions from a starting location to a destination location.

Accordingly, the road surface type routing engine 68 may obtain road surface type data for a geographic area that includes the starting location and the destination location. More specifically, in some implementations, the road surface type routing engine 68 obtains the road surface type data for a geographic area using machine learning techniques. For example, the road surface type routing engine 68 may obtain aerial or satellite images of geographic areas including road surfaces as training data for training a machine learning model, where the road surface types for the road surfaces are known. In some implementations, each aerial or satellite image includes a single road segment having a single road surface type (e.g., a gravel road) which may be used as a template object for that particular road surface type. The aerial or satellite image for the single road segment may be labeled with an indication of its corresponding road surface type. In other implementations, the aerial or satellite images may include multiple road segments having multiple road surface types. The aerial or satellite image having multiple road segments may be labelled with indications of the road surface types and locations of corresponding road segments within the aerial or satellite image.

In any event, the road surface type routing engine 68 identifies features of the template object or objects (e.g., road segments) within an aerial or satellite image. The features of the template object may include the geometry of the edges of the template object, RGB pixel values or colors within the template object, changes in RGB pixel values at adjacent locations within the template object, an intersection of the template object with another template object where the template objects appear to crossover each other (e.g., indicative of a bridge underpass), etc. These features may be identified by detecting stable regions within the template object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina key point (FREAK), binary robust invariant scalable key points (BRISK), or any other suitable computer vision techniques. In some embodiments, key points may be located at high-contrast regions of the object, such as edges within the object. A bounding box may be formed around a key point and the portion of the object created by the bounding box may be a feature.

The machine learning model may be generated based on the features of the template objects corresponding to different road surface types, such as dirt, asphalt, concrete, grass, gravel, brick, cobblestone, a bridge underpass, etc. In other implementations, the road surface types may be paved or unpaved, or may include both an indication of paved or unpaved as well as an indication of the particular road surface type from a set of road surface types, such as dirt, asphalt, concrete, grass, gravel, brick, cobblestone, and a bridge underpass. The machine learning model may include a set of features for each type of road surface, such as a first set of features for an asphalt road, a second set of features for a dirt road, a third set of features for a concrete road, a fourth set of features for grass, a fifth set of features for a gravel road, a sixth set of features for a brick road, a seventh set of features for a cobblestone road, an eighth set of features for a bridge underpass, etc. For example, the colors of a road segment may be stored as template features along with the width of the road segment, a color gradient of the road segment, and/or other visual features of the road segment.

Then for a geographic area having road segments where the road surface types are unknown, the road surface type routing engine 68 may obtain an aerial or satellite image of the geographic area and may identify features of an object or objects (e.g., road segments) within the aerial or satellite image using similar techniques as described above. The road surface type routing engine 68 may compare the features identified for an object within the aerial or satellite image using image classification and/or machine learning techniques. The machine learning techniques may include linear regression, polynomial regression, logistic regression, random forests, boosting, nearest neighbors, Bayesian networks, neural networks, support vector machines, or any other suitable machine learning technique. Each of the template features from the machine learning model may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of a road segment, RGB pixel values for the road segment, color gradients within the road segment, an intersection of the road segment with another road segment where the road segments appear to crossover each other (e.g., indicative of a bridge underpass), for example. The numerical representations of the features or feature vectors of the object may be compared to the feature vectors of template objects to determine a vector distance between the features of the object and each template object. The road surface type routing engine 68 may then determine the road surface type for an object based on the amount of similarity, or the vector distance in the nearest neighbors algorithm, between the features for the object and the features for template objects that represent a particular road surface type. For example, if the closest template objects represent a grass surface, the object is identified as grass. In another example, if the closest template objects represent an asphalt surface, the object is identified as an asphalt road.

When the road surface type routing engine 68 identifies a road surface type for an object within the aerial or satellite image of a geographic area by applying features for objects within the aerial or satellite image to the machine learning model, the road surface type routing engine 68 may store an indication of the road surface type and/or the location of the road segment within the aerial or satellite image in the database 80. In this manner, the road surface type of the road surface may be retrieved from the database 80 when a user subsequently requests navigation directions within a geographic area including the road segment.

In other implementations, road surface types are identified for each road segment and stored in the database 80 for retrieval when a user requests navigation directions. In yet other implementations, road surface types of some of the road segments are stored in the database 80. When a user requests navigation directions within a geographic area, the road surface type routing engine 68 queries the database 80 for road surface types for road segments within the geographic area. If the database 80 does not include road surface types for road segments within the geographic area, the road surface type routing engine 68 obtains an aerial or satellite image of the geographic area, identifies objects within the aerial or satellite image and their visual features, and applies the visual features of each object to the machine learning model to identify a road surface type corresponding to the object. Then the road surface type routing engine 68 stores an indication of the road surface type and/or the location of the road segment within the aerial or satellite image in the database 80.

In any event, the road surface type routing engine 68 obtains road surface type data for the geographic area that includes the starting location and the destination location by applying visual features from an aerial or satellite image of the geographic area to a machine learning model or by retrieving the road surface type data for the geographic area from a database 80. This is described in more detail below with reference to FIGS. 2 and 3. The road surface type data may include indications of road surface types within the geographic area and/or locations of each road segment having a corresponding road surface type within the geographic area. The locations may be pixel locations within a raster image of the geographic area, such as the aerial or satellite image.

In some implementations, as mentioned above, the road surface type routing engine 68 retrieves map data of the geographic area which is in a vector graphics format. The road surface type data may be in a raster format and, accordingly, the road surface type routing engine 68 may convert the road surface type data to a vector graphics format to compare the road segments within the map data to road segments within the road surface type data to identify road surface types for the road segments within the map data. To convert the road surface type data from a raster format to a vector graphics format, the road surface type routing engine 68 may categorize each aerial or satellite image of a geographic area as corresponding to a particular map tile of a set of map tiles at multiple zoom levels which combine to represent the world. Then within each map tile, the road surface type routing engine 68 may approximate the displacement between the raster data and the vector graphics data using a translation vector through a least-squares optimization applied to a subset of the raster data and the vector graphics data. The road surface type routing engine 68 then applies the translation vector to the road segments in the raster format within the road surface type data to convert the locations of the road segments into a vector graphics format. Once the locations of the road segments are converted into the vector graphics format, the road surface type routing engine 68 may identify a road segment within the map data at matching locations as the converted road segment from the road surface type data, and may determine the road surface type for the road segment within the map data based on the road surface type of the converted road segment at the matching location.

In addition to identifying road surface types for road segments within the geographic area that includes the starting and destination locations, the road surface type routing engine 68 identifies a set of candidate routes for navigating from the starting location to the destination location. The candidate routes may include several road segments, and the road surface type routing engine 68 may obtain an estimated time period for traversing each candidate route and/or each road segment on each candidate route. For example, the road surface type routing engine 68 may obtain a set of candidate routes and estimated time periods for traversing the candidate routes from the navigation server 22, from the schematic and satellite database 30, and/or from the traffic database 36.

For each candidate route, the road surface type routing engine 68 identifies the road surface type of the road segments within the candidate route. Then the road surface type routing engine 68 assigns a score to each road segment based on the road surface type of the road segment and the estimated time period for traversing the road segment. In some implementations, the road surface type routing engine 68 obtains current weather conditions for the geographic area that includes the starting location and the destination location and/or weather conditions over a particular time interval (e.g., the previous week). The score assigned to the road segment may also be based on the current weather conditions or weather conditions over the particular time interval in the geographic area.

The road surface type routing engine 68 may assign a time score to the road segment based on the estimated time period for traversing the road segment. The time score may be proportional to the estimated time period for traversing the road segment, such that shorter estimated time periods have lower scores. The road surface type routing engine 68 may also assign a road surface type score to the road segment based on the road surface type of the road segment. Paved road segments such as asphalt or concrete may be assigned lower scores than unpaved road segments, such as dirt, gravel, and grass. Additionally, asphalt or concrete roads segments may be assigned lower scores than cobblestone or brick road segments.

Moreover, the road surface type routing engine 68 may assign a weather score to the road segment based on current or recent weather conditions in the geographic area. The weather score may also take into account the road surface type. For example, a dirt road in an area which recently experienced rain may be assigned a lower score than a concrete road in an area which recently experienced rain. In another example, during strong winds a gravel road may be assigned a lower score than an asphalt road. In yet another example, after a threshold amount of precipitation or flooding a concrete road may be assigned a lower score than a bridge underpass. Even if there is less than the threshold amount of precipitation in the geographic area, the bridge underpass may be an area where precipitation is likely to accumulate. Therefore, if there is fog, clouds, or rain, a bridge underpass may be assigned a higher score than road segments having other road surface types, so that a route having road segments where precipitation is not likely to accumulate may be selected.

Still further, the road surface type routing engine 68 may assign a scarcity score to the road segment based on the scarcity of the road surface type of the road segment within the geographic area. For example, if the road segment is a dirt road but a large percentage of each of the road segments in the geographic area are dirt roads, the scarcity score may be lower than for a road segment which is a dirt road in an area where the road segment is the only dirt road in the geographic area. Furthermore, the road surface type routing engine 68 may assign a vehicle type score to the road segment based on an amount in which the road surface type for the road segment will impact the performance of the vehicle according to the type of vehicle. The road surface type routing engine 68 may then aggregate or combine the scores for the road segment in any suitable manner to generate an overall score for the road segment. The road surface type routing engine may also aggregate or combine the overall scores for the road segments in any suitable manner to generate an overall score for the candidate route.

The road surface type routing engine 68 may then rank the candidate routes according to their overall scores and select the candidate route having the lowest overall score as the route to provide to the user. The road surface type routing engine 68 then transmits a set of navigation directions for presentation on the client device 12 for navigating from the starting location to the destination location via the selected route.

In other implementations, the road surface type routing engine 68 provides indications of each of the candidate routes to the client device 12 in a ranked order according to the respective overall scores. In this manner, the user may select one of the candidate routes for navigating to the destination location. The road surface type routing engine 68 may provide alerts to the client device 12 for candidate routes or a selected route having particular road surface types, such as unpaved roads or having road segments with overall scores below a threshold score.

Figure 2:
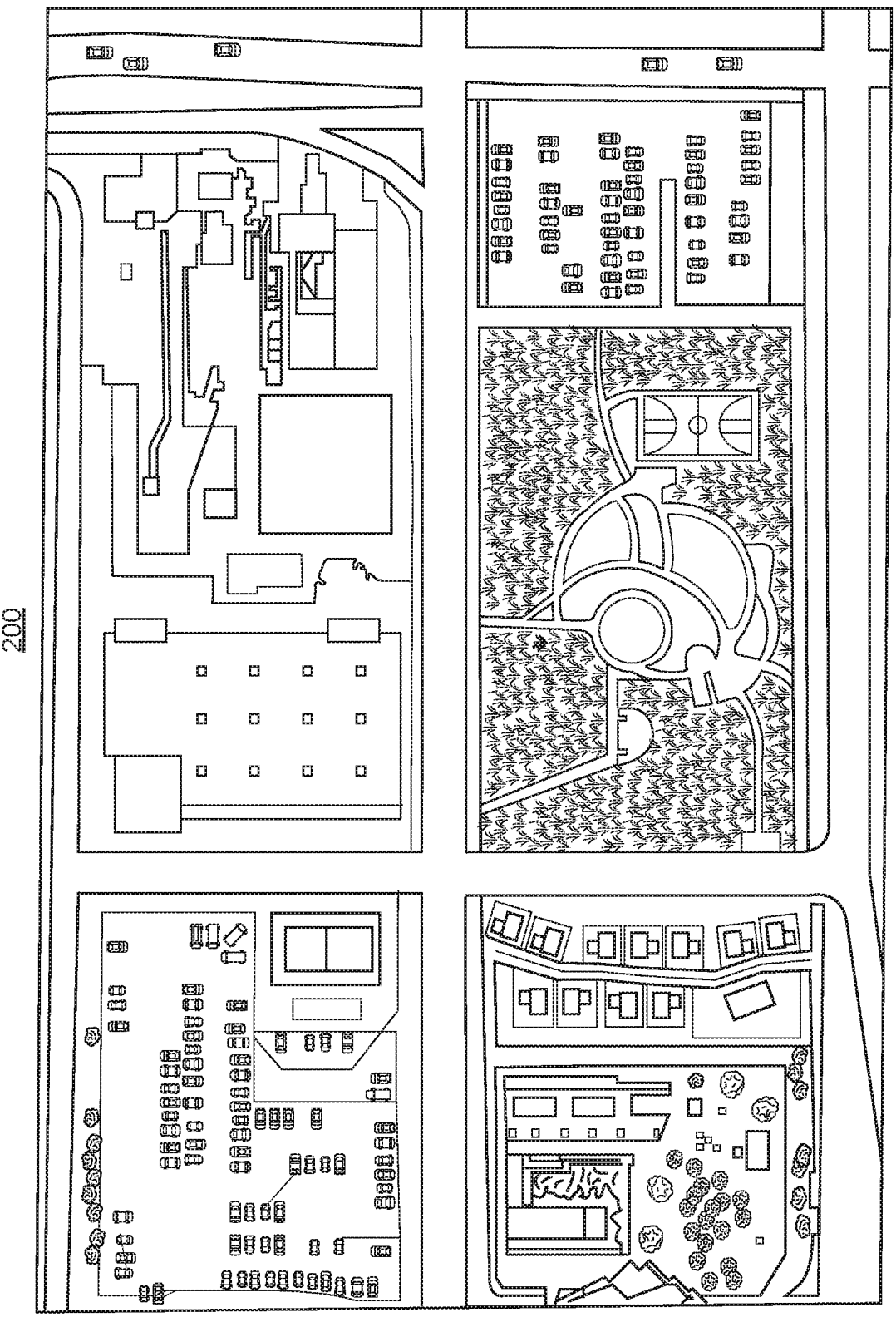
FIG. 2 illustrates an example aerial or satellite image of a geographic area which may be used to identify road surface types of road segments within the geographic area.

FIG. 2 illustrates an example aerial or satellite image 200 of a geographic area. The road surface type routing engine 68 may obtain the aerial or satellite image 200 in response to receiving a request for navigation directions from a starting location to a destination location within the geographic area. The geographic area may correspond to a map tile at a particular zoom level of a set of map tiles at multiple zoom levels which combine to represent the world. For example, the road surface type routing engine 68 may obtain the aerial or satellite image 200 from the schematic and satellite database 30. The road surface type routing engine 68 may then analyze the aerial or satellite image 200 to identify road segments within the aerial or satellite image 200 and their corresponding road surface types. More specifically, the road surface type routing engine 68 may identify objects within the aerial or satellite image 200 corresponding to road segments and may identify visual features of the objects. For each object, the road surface type routing engine 68 may apply a set of visual features for the object to a machine learning model to identify the road surface type for the object. For example, the machine learning model may include several template objects corresponding to different road surface types. The road surface type routing engine 68 may compare feature vectors for the object to feature vectors for each of the template objects and may identify the road surface type of the template object having the smallest vector distance from the object as the road surface type for the object.

Figure 3:
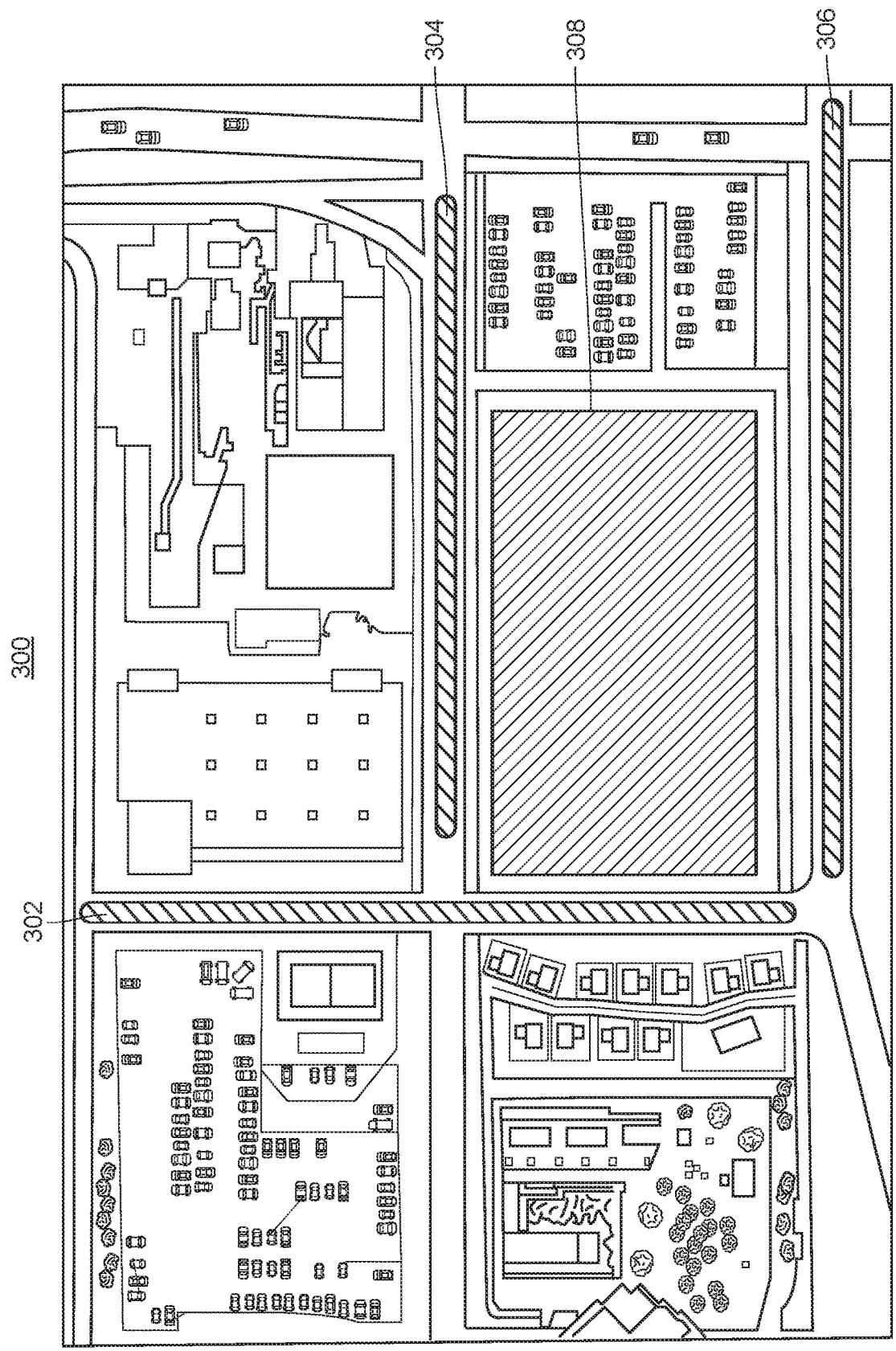
FIG. 3 illustrates an example aerial or satellite image of the geographic area of FIG. 2 annotated with indications of road surface types for road segments within the geographic area by applying visual features of the aerial or satellite image to a machine learning model to identify road surface types at various locations within the geographic area.

FIG. 3 illustrates an example image 300 including the example aerial or satellite image 200 of the geographic area of FIG. 2 annotated with indications of road surface types for road segments within the geographic area. The example image 300 may be generated after applying the visual features for objects within the aerial or satellite image 200 of the geographic area to the machine learning model. In the example image 300, a first set of road segments 302-306 are annotated with a first type of annotation indicating that the road surface type for the first set of road segments 302-306 is asphalt. For example, feature vectors for the road segment 302 may be compared to template feature vectors for several template objects having different road surface types. The feature vectors for the road segment 302 may have the smallest vector distance from template feature vectors for a template object corresponding to an asphalt road. An additional road segment 308 is annotated with a second type of annotation indicating that the road surface type for the additional road segment 308 is grass. For example, feature vectors for the road segment 308 may be compared to template feature vectors for several template objects having different road surface types. The feature vectors for the road segment 308 may have the smallest vector distance from template feature vectors for a template object corresponding to a grass surface. The road surface type routing engine 68 may then store indications of the road surface types and their corresponding locations in the database 80.

To select a route for navigating from the starting location to a destination location, the road surface type routing engine 68 may receive a set of candidate routes from the navigation server 22, where each of the candidate routes may be used to navigate from the starting location to the destination location. In addition to receiving the set of candidate routes, the road surface type routing engine 68 obtains indications of road segments within a geographic area that includes the starting location and the destination location and characteristics of each road segment. The characteristics of each road segment may include the road surface type of the road segment, an estimated time period for traversing the road segment based on the length of the road segment and/or current traffic data, current weather conditions at a geographic area including the road segment and/or weather conditions over a particular time interval or predefined period of time before receiving the request (e.g., the previous week, the previous N days, etc.), a scarcity metric for the road segment based on the scarcity of the road surface type of the road segment within the geographic area, and/or a vehicle type metric based on an amount in which the road surface type for the road segment will impact the performance of the vehicle according to the type of vehicle.

The road surface type for the road segment may be obtained from the database 80 or by applying an aerial or satellite image of a geographic area that includes the road segment to a machine learning model. The estimated time period for traversing the road segment may be obtained from the navigation server 22, and the current weather conditions or weather conditions over a particular time interval may be obtained from the weather database 38.

The road surface type routing engine 68 may generate a weather metric for the road segment based on the current weather conditions or weather conditions over a particular time interval as well as the road surface type for the road segment. In some implementations, the road surface type routing engine 68 may store a data table of road surface types and weather conditions (e.g., rain, snow, sleet, ice, hail, fog, high winds, flooding, a threshold amount of precipitation, etc.) that includes a weather metric for each combination of road surface type and weather condition in the data table. The data table may include a lower weather metric for a concrete road in an area which recently experienced rain than a dirt road in an area which recently experienced rain. In another example, the data table may include a lower weather metric for an asphalt road during high winds than a gravel road. In yet another example, after a threshold amount of precipitation (e.g., accumulated over the previous N days) or flooding a concrete road may be assigned a lower score than a bridge underpass.

Moreover, the road surface type routing engine 68 may generate the scarcity metric for the road segment based on the road surface type of the road segment and the road surface types of road segments within the geographic area or the road surface types of road segments within a threshold radius of the road segment (e.g., 10 km). The scarcity metric may be determined as a function of the proportion of road segments within the geographic area or threshold radius of the road segment that have the same road surface type as the road segment. A road segment having a road surface type that differs from the other road surface types in the geographic area may have a higher scarcity metric than a road segment having a road surface type that is the same as the road surface types of other road segments in the geographic area.

The road surface type routing engine 68 may obtain the type of vehicle tor navigating from the starting location to the destination location from the request for navigation directions. For example, the user may input the vehicle type when requesting navigation directions. In other implementations, such as when the client device 12 is communicatively coupled to a vehicle head unit for the vehicle, the client device 12 may communicate with the vehicle head unit to obtain the vehicle type and may provide an indication of the vehicle type to the road surface type routing engine 68. For example, the vehicle type may be a sport utility vehicle, a sedan, a vehicle with all wheel or four wheel drive, a smart car, a compact car, a truck, a pickup truck, etc. Then the road surface type routing engine 68 may generate the vehicle type metric for the road segment based on an amount in which the road surface type for the road segment will impact the performance of the vehicle according to the type of vehicle. For example, the road surface type routing engine 68 may store a data table of road surface types and vehicle types that includes a vehicle type metric for each combination of road surface type and vehicle type in the data table. The data table may include a lower vehicle type metric for a pickup truck on a dirt road than for a smart car on a dirt road, because the pickup truck is less likely to get stuck in the mud on the dirt road than the smart car.

The road surface type routing engine 68 may then assign an overall score or metric to each road segment based on the characteristics of the road segment. For example, for a particular road segment the road surface type routing engine 68 may aggregate or combine a time score for the road segment based on the estimated time period for traversing the road segment, a road surface type score for the road segment based on the road surface type of the road segment, a weather metric for the road segment based on current or recent weather conditions in the geographic area and/or the road surface type, a scarcity metric for the road segment, and a vehicle type metric for the road segment in any suitable manner to generate the overall score for the road segment.

Then the road surface type routing engine 68 may select a route for navigating from the starting location to the destination location using a pathfinding algorithm, where each road segment is assigned a weight corresponding to the overall score for the road segment. In some implementations, the road surface type routing engine 68 traverses each path or candidate route from the starting location to the destination location using the road segments in the geographic area and their corresponding weights to identify a path or route having the lowest combined weight. In other implementations, the road surface type routing engine 68 traverses each path or candidate route from the starting location to the destination location using the road segments in the geographic area and their corresponding weights to identify a threshold number of paths or routes (e.g., five) having the lowest combined weights for presenting the identified routes in a ranked order according to the combined weights. In yet other implementations, the road surface type routing engine 68 obtains a set of candidate routes from the navigation server 22. The road surface type routing engine 68 then traverses each candidate route from the starting location to the destination location using the road segments on the candidate route and their corresponding weights to identify a route of the set of candidate routes having the lowest combined weight.

For example, beginning at the starting location each of the road segments in the geographic area are included in a set of candidate road segments. The road surface type routing engine 68 may identify a road segment having the lowest weight (e.g., having the lowest overall score) which is connected to the starting location and may remove the identified road segment from the set. Next, the road surface type routing engine 68 identifies a road segment remaining in the set having the lowest weight which is connected to the previously identified road segment and removes the identified road segment from the set. This process is repeated until the destination location is reached. When the destination location is reached, the road surface type routing engine 68 identifies the set of identified road segments as a candidate route.

This process is then repeated for road segments which were not selected in the first iteration. In a second iteration, the road surface type routing engine 68 identifies a second candidate route including a second set of road segments for traversing from the starting location to the destination location. After the road surface type routing engine 68 has selected each of the road segments the process is completed. The road surface type routing engine 68 then compares the candidate routes and selects the candidate route having the lowest combined weight as the route.

Figure 4:
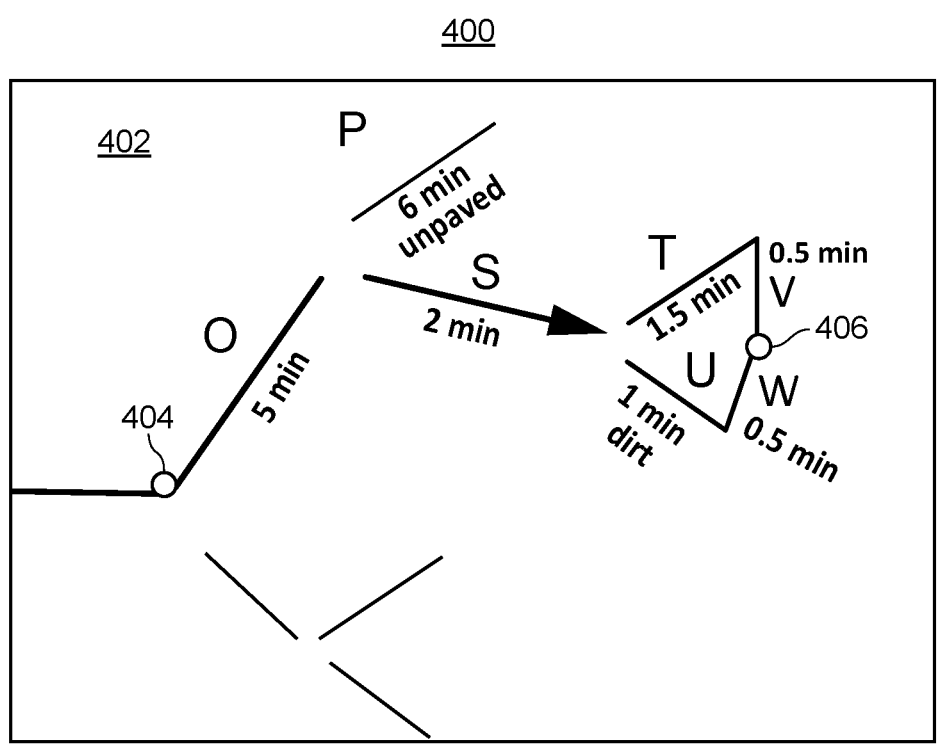
FIG. 4 illustrates an example graph for selecting a navigation route to the destination location using a least-cost path analysis based on estimated time periods for traversing road segments and road surface types for the road segments.

FIG. 4 illustrates an example display 400 of a geographic area 402 including the starting location 404 and the destination location 406 and having road segments O, P, S, T, U, V, and W. The road surface type routing engine 68 may analyze the road segments to identify one or more routes from the starting location 404 to the destination location 406. Each road segment is assigned a weight corresponding to the overall score for the road segment. The overall score may be based on any suitable combination of the estimated time period for traversing the road segment, the road surface type for the road segment, a weather metric for the road segment, a scarcity metric for the road segment, and/or a vehicle type metric for the road segment.

For example, road segment O may have a weight of 5 corresponding to an overall score of 5 based on an estimated time period for traversing road segment O of 5 minutes and a road surface type score of 1 for a paved road surface type. Road segment P may have a weight of 9 corresponding to an overall score of 9 based on an estimated time period for traversing road segment P of 6 minutes and a road surface type score of 1.5 for an unpaved road surface type. Road segment S may have a weight of 2 corresponding to an overall score of 2 based on an estimated time period for traversing road segment S of 2 minutes and a road surface type score of 1 for a paved road surface type. Road segment T has a weight of 1.5 corresponding to an overall score of 1.5 based on an estimated time period for traversing road segment T of 1.5 minutes and a road surface type score of 1 for a paved road surface type. Road segment U has a weight of 2 based on an estimated time period for traversing road segment U of 1 minute and a road surface type score of 2 for a dirt road surface type. Road segments V and W have weights of 0.5 corresponding to overall scores of 0.5 based on estimated time periods for traversing road segments V and W of 0.5 minutes and road surface type scores of 1 for paved road surface types.

Accordingly, the road surface type routing engine 68 may determine that the combined weight is the lowest for a candidate route including road segments O, S, T, and V. The combined weight for the candidate route including road segments O, S, T, and V is 9 while the combined weight for the candidate route including road segments O, S, U, and W is 9.5. This is the case even though the combined estimated time period for traversing road segments O, S, T, and V is higher (9 minutes) than the combined estimated time period for traversing road segments O, S, U and W (8.5 minutes), because the dirt road surface type of road segment U increases the overall score for road segment U.

While the example road segments O, P, S, T, U, V, and W in the example display 400 have weights based on estimated time periods for traversing the road segments and road surface types, this is merely one example for ease of illustration only. The weights for each road segment may also be based on a weather metric for the road segment, a scarcity metric for the road segment, and a vehicle type metric for the road segment as described above, or any other suitable metric for the road segment. Also in the example display 400, road segment U is the only road segment with a dirt road surface type. Accordingly, the scarcity metric for road segment U may be higher (e.g., 1) than if for example, several of the road segments had dirt road surface types (e.g., 0.5). If several of the road segments had dirt road surface types, the combination of the scarcity metric with the road surface type metric and the estimated time period for traversing road segment U may lead to an overall score and corresponding weight of less than 1.5 and may cause the candidate route including road segments O, S, U, and W to have the lowest combined weight.

After selecting a route from the set of candidate routes having the lowest combined weight or selecting a threshold number of routes from the set of candidate routes having the lowest combined weights, the road surface type routing engine 68 may provide a set of navigation directions for traveling from the starting location to the destination location along the selected route to the client device 12. The road surface type routing engine 68 may also provide alerts to the client device 12 for road segments along the route having a particular road surface type, such as unpaved road segments or road segments having dirt, grass, gravel, brick, cobblestone, or bridge underpass road surface types.

In some implementations, the road surface type routing engine 68 may receive an indication of the user's current location along the selected route. The road surface type routing engine 68 may continue to receive updated weather conditions (e.g., periodically or continuously) for the geographic area that includes the starting location and the destination location or a second geographic area which includes the user's current location and the destination location and at least partially includes the selected route and/or the set of candidate routes. When the weather conditions change within the geographic area (e.g., from sunny to snowing), the road surface type routing engine 68 may reevaluate the road segments along the selected route which the user has not traversed based on the updated weather conditions. If an overall score for one of the road segments increases by more than a threshold amount or an updated candidate route has a lower combined score based on the updated weather conditions, the road surface type routing engine 68 may provide an alternative set of navigation directions for traveling from the user's current location to the destination location along an updated route. The digital navigation module 44 in the client device 12 may then reroute the user in accordance with the alternative set of navigation directions.

Moreover, the road surface type routing engine 68 may provide alternative sets of navigation directions for traveling from the starting location to the destination location along alternative routes to the client device 12, where the alternative routes do not include any unpaved road segments or road segments having dirt, grass, gravel, brick, cobblestone, or bridge underpass road surface types. In this manner, the user may select a user control on the client device 12 to select an alternative route which does not include unpaved road segments or road segment having dirt, grass, gravel, brick, cobblestone, or bridge underpass road surface types. In other implementations, the alternative sets of navigation directions may include fewer unpaved road segments or fewer road segments having dirt, grass, gravel, brick, cobblestone, or bridge underpass road surface types than the road segments on the selected route. When there is no alternative set of navigation directions having fewer unpaved road segments or fewer road segments having dirt, grass, gravel, brick, cobblestone, or bridge underpass road surface types, the road surface type routing engine 68 may provide an alert to the client device 12 indicating that there are no suitable alternatives.

Figure 5A:
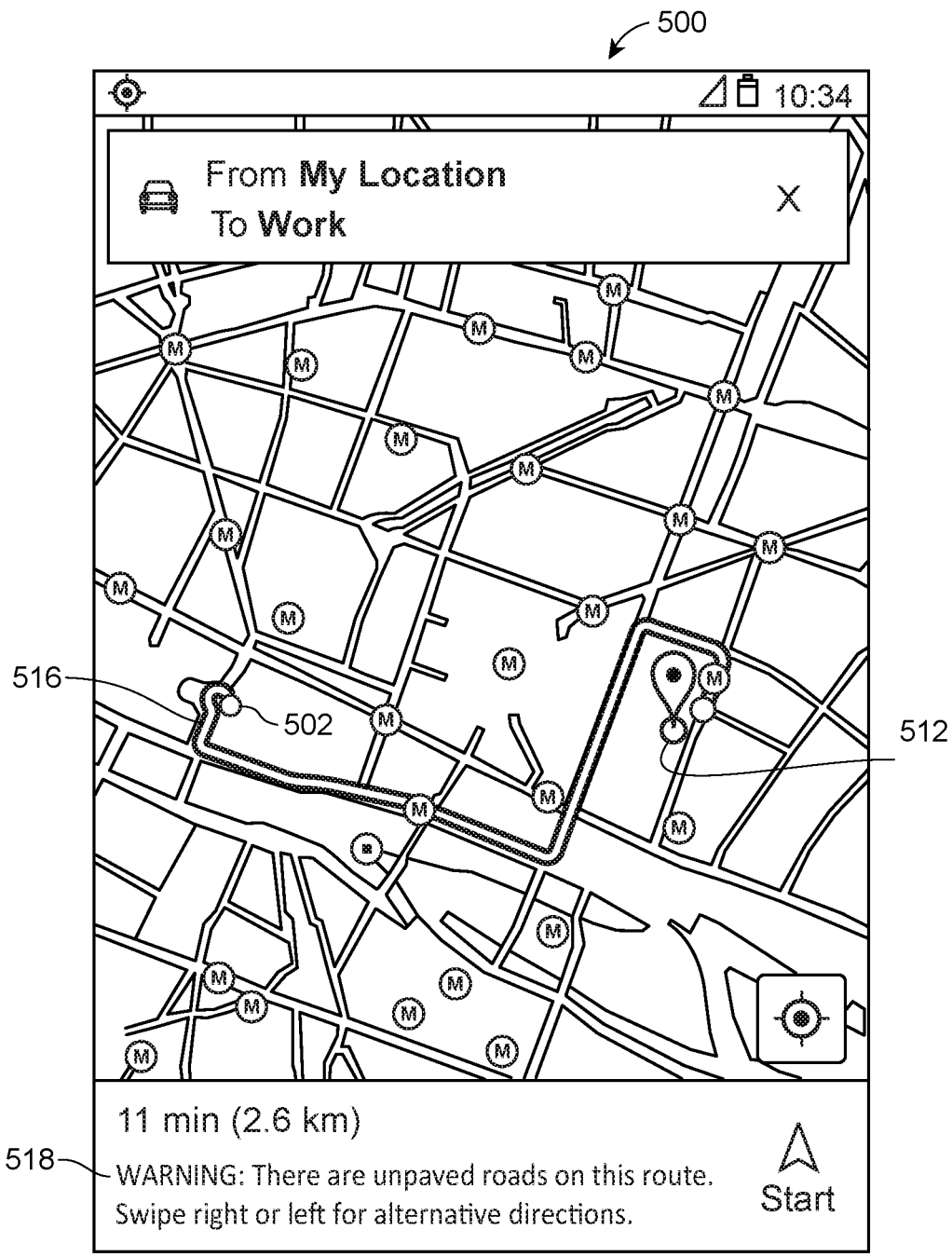
FIG. 5A illustrates an example navigation display indicating a route from a starting location to a destination location and including an alert indicating a road surface type for one of the road segments.

FIG. 5A illustrates an example navigation display 500 which may be presented on the client device 12. The example navigation display 500 includes an indication of a route 516 from a starting location 502 to a destination location 512 and includes an alert 518 indicating a road surface type for one of the road segments. The route 516 may be selected by the road surface type routing engine 68 from a set of candidate routes, using the techniques described above. While the route 516 may have the lowest combined weight of the set of candidate routes, the route 516 includes unpaved road segments. Accordingly, the example navigation display 500 presents an alert 518 indicating that there are unpaved road segments on the route 518. The example navigation display 500 may present a user control for selecting an alternative set of navigation directions which does not include at least one of the unpaved road segments. Then the user may select from one or several alternative sets of navigation directions for traveling from the starting location 502 to the destination location 512 along different alternative routes via the user control, such as swiping to the left or right. The alternative sets of navigation directions may have fewer unpaved road segments or fewer road segments having dirt, grass, gravel, brick, cobblestone, or bridge underpass road surface types than the road segments on the route 516.

Moreover, the navigation display 500 may highlight road segments along the route 516 which are unpaved or have dirt, grass, gravel, brick, cobblestone, or bridge underpass road surface types by overlaying a color or shading over the road segments which are unpaved or have dirt, grass, gravel, brick, cobblestone, or bridge underpass road surface types which is different from the color or shading overlaid on other road segments along the route 516. For example, road segments along the route 516 may be highlighted with a blue color on the navigation display 500 by default. A subset of the road segments along the route 516 which are unpaved or have dirt, grass, gravel, brick, cobblestone, or bridge underpass road surface types may be highlighted with a brown color on the navigation display 500. When the user is selecting a set of navigation directions for travelling from the starting location to the destination location along a route 516, the user, via a user control such as a swipe gesture, may view alternative sets of navigation directions and indications of road surface types for road segments along alternative routes to select a particular route.

The alert 518 may also include a description for identifying the unpaved road segments on the route 516, such as on Main Street between State Street and North Avenue. Furthermore, the alert 518 may include an indication of the amount of time saved by travelling on a route having unpaved road segments instead of an alternative route without unpaved road segments. Moreover, the alert 518 may include a warning regarding the weather conditions and/or how the weather conditions may affect particular road segments based on their respective road surface types. For example, the alert 518 may explain that a heavy storm is expected to begin in the next 15 minutes and may explain that it is particularly important to avoid dirt roads which may turn into mud during the storm. In another example, the alert 518 may indicate that there is a bridge underpass road segment on the route 516 and may identify the location of the bridge underpass road segment. In this manner, if the user is driving a truck which is unable to travel on a bridge underpass road segment, the user may select an alternative route.

Figure 5B:
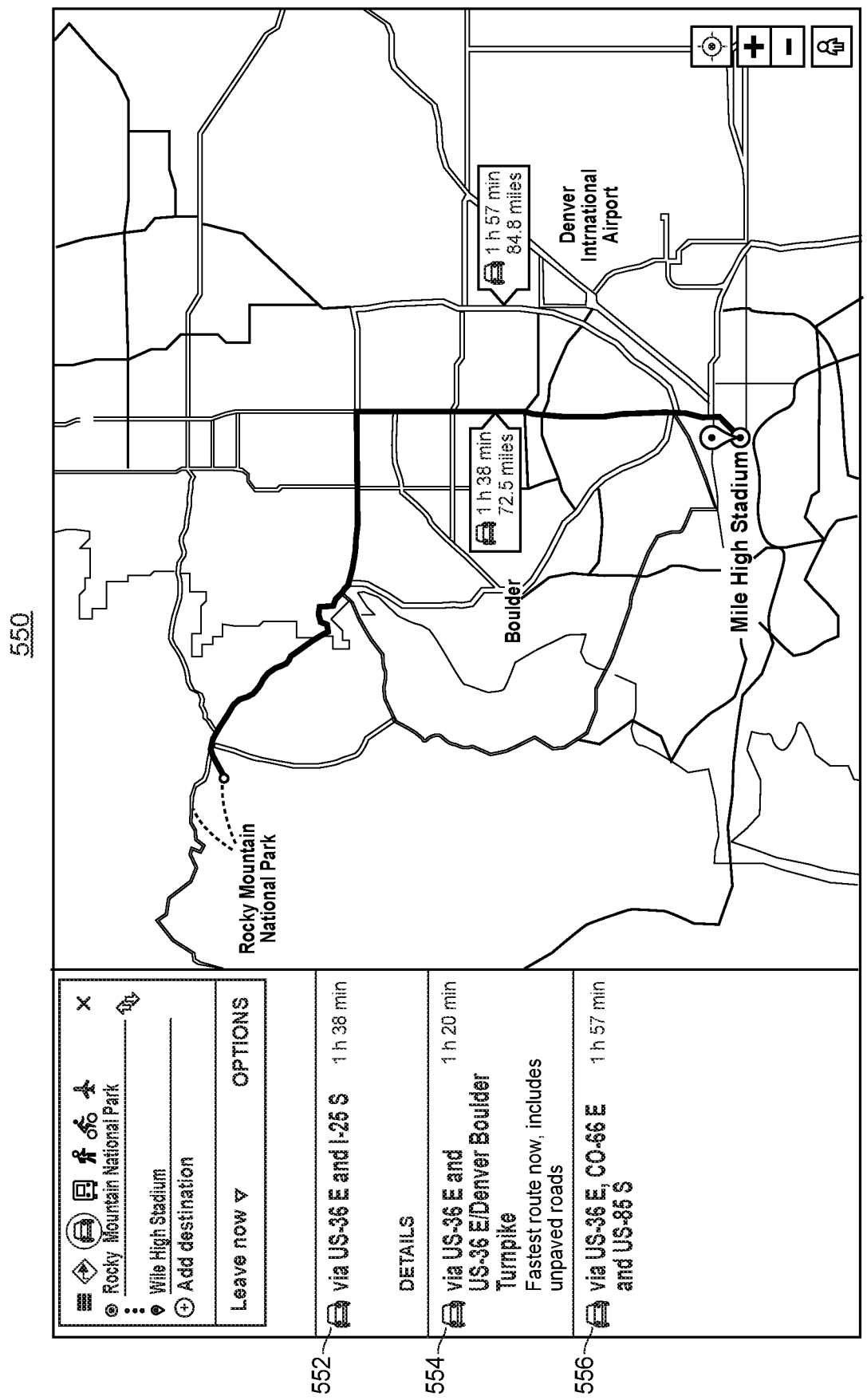
FIG. 5B illustrates another example navigation display indicating several routes from the starting location to the destination location for the user to select from which are presented in ranked order.

In addition to presenting a single set of navigation directions, the digital navigation module 44 may present a navigation display with indications of multiple sets of navigation directions for travelling along different routes from the starting location to the destination location for the user to choose from via user controls. FIG. 5B illustrates another example navigation display 550 indicating several routes 552-556 from the starting location to the destination location for the user to select from which are presented in a ranked order. For example, in response to a request for navigation directions from Rocky Mountain National Park to Mile High Stadium, the road surface type routing engine 68 may select a threshold number of routes (e.g., 3) from a set of candidate routes having the lowest combined weights, and may rank the threshold number of routes in order of combined weight, where the route having the lowest combined weight may be ranked the highest. Then the road surface type routing engine 68 may provide sets of navigation directions including indications of the selected routes to the digital navigation module 44 to present on the navigation display 550. Each indication of a route 552-556 includes a description of the road segments along the route (e.g., via US-36 E and I-25S), an indication of the estimated time period for traversing the route, and/or a description of road surface types of the road segments along the route (e.g., Fastest route now, includes unpaved roads).

In the navigation display 550, the highest ranked route 552 does not have the shortest estimated time period for travelling from Rocky Mountain National Park to Mile High Stadium. Instead, the second highest ranked route 554 has the shortest estimated time period for travelling from Rocky Mountain National Park to Mile High Stadium but includes unpaved roads. Accordingly, the combined score/weight for the second highest ranked route 554 exceeds the combined score/weight for the highest ranked route 552 despite having a shorter estimated time period of traversal.

In response to the user selecting one of the indications of the routes 552-556 via a user control, such as touch-selecting or clicking on an indication of one of the routes 552-556, the navigation display 550 may present an indication of the selected route within the map view 560. For example, the navigation display 550 may highlight the selected route within the map view 560. In the example navigation display 550, the highest ranked route 552 is selected and highlighted in the map view 560.

Figure 6:
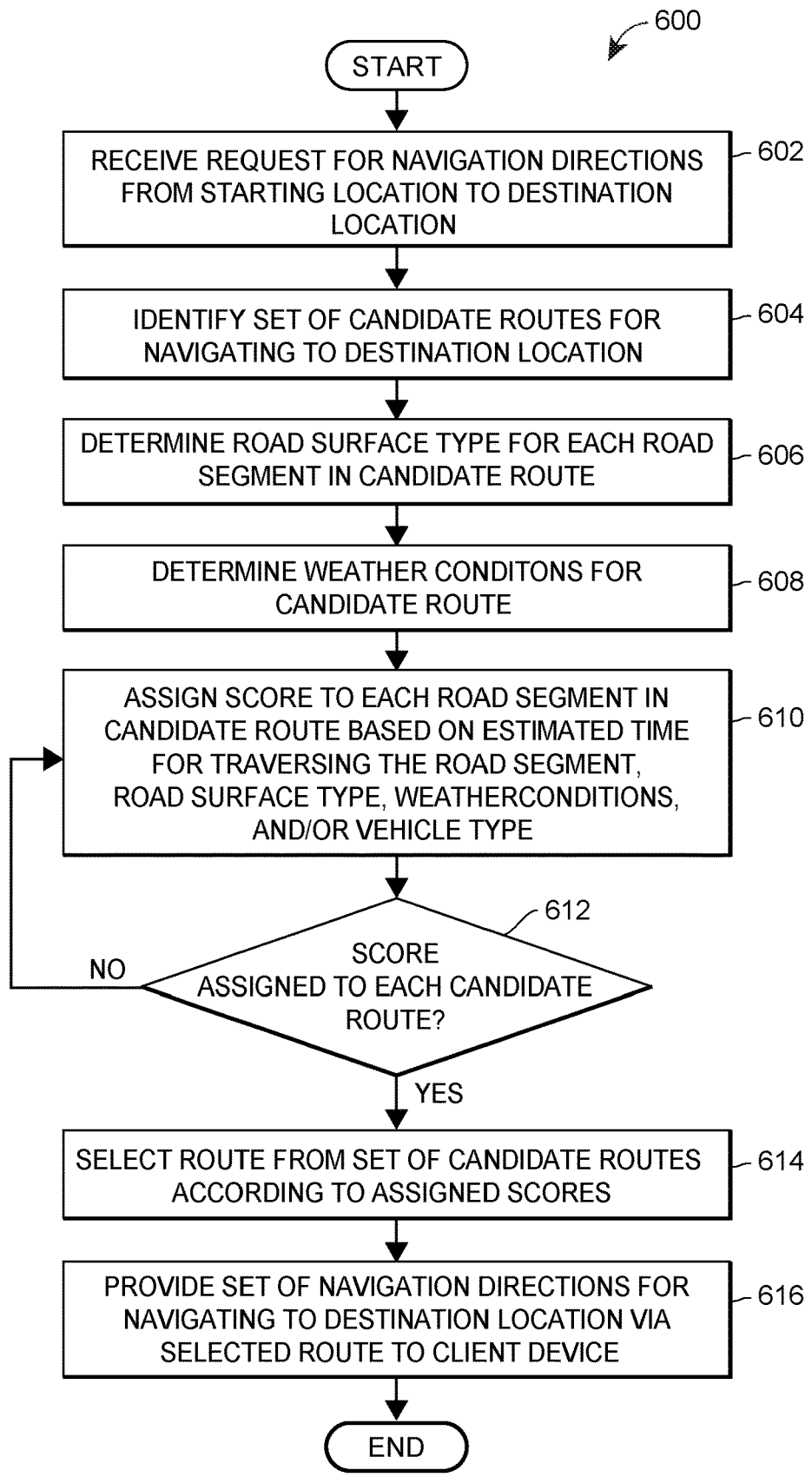
FIG. 6 is a flow diagram of an example method for generating a set of navigation directions according to road surface types of road segments, which may be implemented in a server device.

FIG. 6 illustrates an example method 600 for generating a set of navigation directions according to road surface types of road segments, which can be implemented at a network server (such as the road surface type routing server 60), for example. The method can be implemented in a set of instructions stored on a computer-readable memory and executable at one or more processors of the road surface type routing server 60. For example, the method can be implemented by the road surface type routing engine 68.

At block 602, a request is received for navigation directions from a starting location to a destination location. The request may also include a type of the vehicle travelling to the destination location.

Then the road surface type routing server 60 identifies a set of candidate routes for navigating from the starting location to the destination location (block 604). Each candidate route may include several road segments. In some implementations, the road surface type routing server 60 provides the starting location and the destination location to the navigation server 22 and receives the set of candidate routes from the navigation server 22. In other implementations, the road surface type routing server 60 retrieves map data from the schematic and satellite database 30 for a geographic area which includes the starting location and the destination location and identifies candidate routes as sets of road segments within the geographic area for traversing from the starting location to the destination location.

Then at block 606, the road surface type routing server 60 determines a road surface type for each road segment within the set of candidate routes. For example, the road surface type routing server 60 may obtain a road surface type for a road segment from the database 80. If the database 80 does not have a road surface type for the road segment, the road surface type routing server 60 may obtain an aerial or satellite image of the geographic area that includes the road segment. Then the road surface type routing server 60 may identify the road segment within the aerial or satellite image of the geographic area as an object, and may identify visual features of the object. The road surface type routing server 60 may apply a set of visual features for the object to a machine learning model to identify the road surface type for the object. For example, the machine learning model may include several template objects corresponding to different road surface types. The road surface type routing server 60 may compare feature vectors for the object to feature vectors for each of the template objects and may identify the road surface type of the template object having the smallest vector distance from the object as the road surface type for the object.

The road surface type routing server 60 may also determine weather conditions for the geographic area that includes the candidate routes (block 608). The weather conditions may be current weather conditions for the geographic area and/or weather conditions over a particular time interval or predefined period of time before receiving the request (e.g., the previous week). For example, the road surface type routing server 60 may obtain the weather conditions from a weather database 38. In addition to obtaining road surface types and weather conditions, the road surface type routing server 60 may obtain an estimated time period for traversing each road segment in the set of candidate routes.

Then the road surface type routing server 60 may assign an overall score to each road segment in a candidate route (block 610). The overall score may be based on any suitable combination of a time score for the road segment based on the estimated time period for traversing the road segment, a road surface type score for the road segment based on the road surface type of the road segment, a weather metric for the road segment based on current or recent weather conditions in the geographic area and/or the road surface type, a scarcity metric for the road segment, and a vehicle type metric for the road segment.

The road surface type routing server 60 may generate the weather metric for the road segment based on the current weather conditions or weather conditions over a particular time interval at a geographic area that includes the road segment as well as the road surface type for the road segment. In some implementations, the road surface type routing server 60 may store a data table of road surface types and weather conditions (e.g., rain, snow, sleet, ice, hail, fog, high winds, etc.) that includes a weather metric for each combination of road surface type and weather condition in the data table. The data table may include a lower weather metric for a concrete road in an area which recently experienced rain than a dirt road in an area which recently experienced rain.

The road surface type routing server 60 may generate the scarcity metric for the road segment based on the road surface type of the road segment and the road surface types of road segments within the geographic area or the road surface types of road segments within a threshold radius of the road segment (e.g., 10 km). The scarcity metric may be determined as a function of the proportion of road segments within the geographic area or threshold radius of the road segment that have the same road surface type as the road segment. A road segment having a road surface type that differs from the other road surface types in the geographic area may have a higher scarcity metric than a road segment having a road surface type that is the same as the road surface types of other road segments in the geographic area.

The road surface type routing server 60 may generate the vehicle type metric for the road segment based on an amount in which the road surface type for the road segment will impact the performance of the vehicle according to the type of vehicle. For example, the road surface type routing server 60 may store a data table of road surface types and vehicle types that includes a vehicle type metric for each combination of road surface type and vehicle type in the data table. The data table may include a lower vehicle type metric for a pickup truck on a dirt road than for a smart car on a dirt road, because the pickup truck is less likely to get stuck in the mud on the dirt road than the smart car.

The road surface type routing server 60 may combine the scores in any suitable manner to generate the overall score for the road segment. Then the road surface type routing server 60 may use the overall score as a weight for performing a least-cost path analysis to identify the route of the set of candidate routes having the lowest combined weight.

At block 612, the road surface type routing server 60 determines whether an overall score has been assigned to each of the road segments on each of the candidate routes. If overall scores for road segments on one of the candidate routes have not been assigned, the road surface type routing server 60 continues to assign scores to the road segments (block 610). Otherwise, the road surface type routing server 60 selects a route from the set of candidate routes according to the overall scores for the road segments (block 614). For example, the road surface type routing server 60 may select a route having the lowest combined weight, where each road segment along the route is assigned a weight corresponding to the overall score for the road segment.

Then at block 616, the road surface type routing server 60 provides a set of navigation directions for navigating from the starting location to the destination location via the selected route to the client device 12. The client device 12 may then present an indication of the selected route on a navigation display, such as the navigation display 500 as shown in FIG. 5A.

Figure 7:
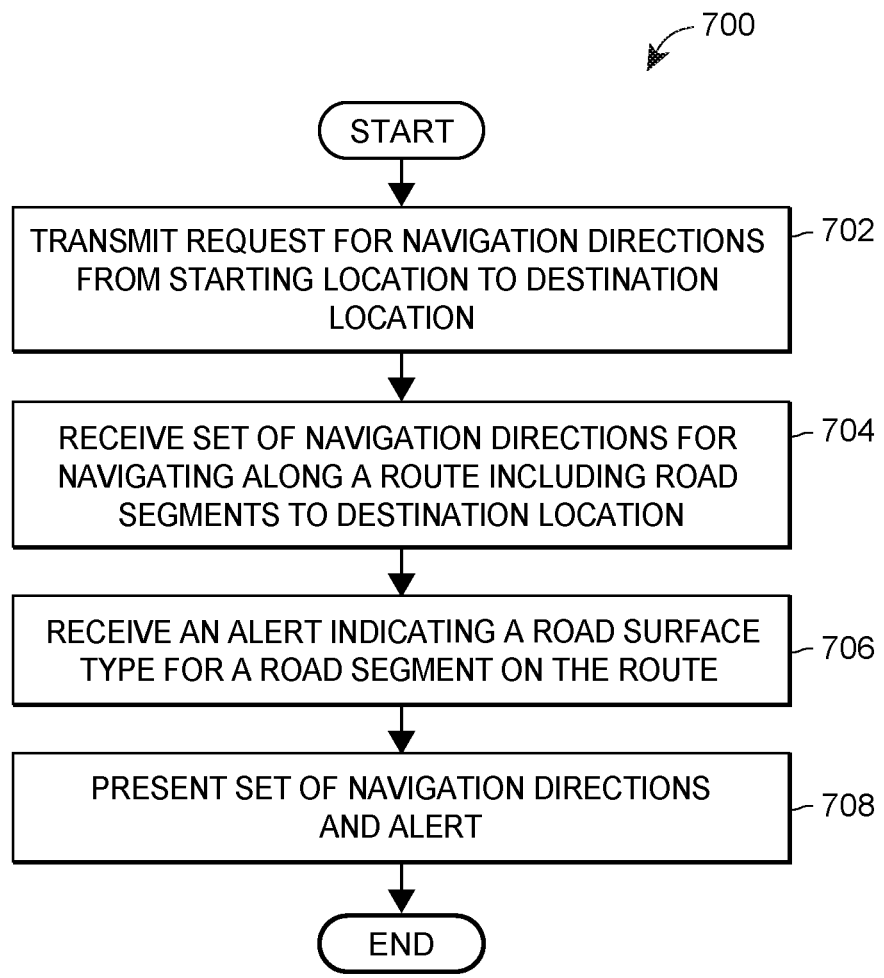
FIG. 7 is a flow diagram of an example method for presenting a set of navigation directions according to road surface types of road segments, which may be implemented in a client device.

FIG. 7 illustrates an example method 700 for presenting a set of navigation directions according to road surface types of road segments, which can be implemented at a client device (such as the client device 12), for example. The method can be implemented in a set of instructions stored on a computer-readable memory and executable at one or more processors of the client device 12. For example, the method can be implemented by the digital navigation module 44.

At block 702, the client device 12 transmits a request for navigation directions from a starting location to a destination location to a server device, such as the road surface type routing server 60. The request may include a type of the vehicle travelling to the destination location.

Then at block 704, the client device 12 receives a set of navigation directions for navigating along a route to the destination location. The route may be selected from a set of candidate routes based on the road surface types of road segments on the route, weather conditions in a geographic area which includes the candidate routes, the scarcity of the road surface types of the road segments on the route, the vehicle type, estimated time periods for traversing each road segment on the road, etc. In other implementations, the client device 12 may receive several sets of navigation directions for navigating along different routes to the destination location.

At block 706, the client device 12 receives an alert indicating a road surface type for a road segment on the route. The alert may be for road segments having a particular road surface type, such as unpaved road segments or road segments having dirt, grass, gravel, brick, cobblestone, or bridge underpass road surface types. The alert may also include a description for identifying the unpaved road segments on the route, such as on Main Street between State Street and North Avenue. Furthermore, the alert may include an indication of the amount of time saved by travelling on a route having unpaved road segments instead of an alternative route without unpaved road segments. Moreover, the alert may include a warning regarding the weather conditions and/or how the weather conditions may affect particular road segments based on their respective road surface types. For example, the alert may explain that a heavy storm is expected to begin in the next 15 minutes and may explain that it is particularly important to avoid dirt roads which may turn into mud during the storm.

Then at block 708, the client device 12 presents the set of navigation directions and the alert on the user interface 58, such as on a navigation display. The set of navigation directions may be presented on the navigation display by highlighting road segments on the navigation display which are on the route corresponding to the set of navigation directions. Moreover, the navigation display may highlight road segments along the route which are unpaved or have dirt, grass, gravel, brick, cobblestone, or bridge underpass road surface types by overlaying a color or shading over the road segments which are unpaved or have dirt, grass, gravel, brick, cobblestone, or bridge underpass road surface types which is different from the color or shading overlaid on other road segments along the route. For example, road segments along the route may be highlighted with a blue color on the navigation display by default. A subset of the road segments along the route which are unpaved or have dirt, grass, gravel, brick, cobblestone, or bridge underpass road surface types may be highlighted with a brown color on the navigation display.

In addition to presenting a single set of navigation directions, the client device 12 may present a navigation display with indications of multiple sets of navigation directions for travelling along different routes from the starting location to the destination location for the user to choose from via user controls. Indications of the different routes may be presented on the navigation display in a ranked order. For example, a first set of navigation directions for a first route having at least one unpaved road segment may be ranked below a second set of navigation directions for a second route without an unpaved road segment. In another example, the estimated time period for traversing the first set of navigation directions may be shorter than the estimated time period for traversing the second set of navigation directions, but the first set of navigation directions may be ranked lower than the second set of navigation directions due to the unpaved road segment(s) on the first route.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating navigation directions according to road surface types through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a set of navigation directions according to road surface types of road segments, the method comprising:
    training, by the one or more processors, a machine learning model for identifying road surface types of road segments using (i) a plurality of images of road segments, and (ii) indications of road surface types for each of the plurality of images of road segments;
    receiving, at one or more processors, a request for navigation directions for a vehicle from a starting location to a destination location;
    identifying, by the one or more processors, a set of candidate routes for navigating from the starting location to the destination location;
    for each road segment within each candidate route in the set of candidate routes, determining, by the one or more processors, a road surface type for the road segment, wherein the road surface type for at least one of the road segments is determined by:
        applying visual features of the road segment to the trained machine learning model;
    selecting, by the one or more processors, a route from the set of candidate routes based at least in part on the road surface types of the road segments within each candidate route; and
    providing, by the one or more processors, a set of navigation directions for presentation on a client device for navigating from the starting location to the destination location via the selected route.

2. The method of claim 1, further comprising:
    obtaining, by the one or more processors, weather conditions in a geographic area at least partially including the candidate routes; and
    wherein selecting the route from the set of candidate routes comprises selecting, by the one or more processors, the route further based on the weather conditions in the geographic area.

3. The method of claim 2, wherein:
    obtaining, by the one or more processors, weather conditions in the geographic area comprises obtaining weather conditions in the geographic area for a predefined period of time before receiving the request.

4. The method of claim 2, further comprising:
    for each road segment within each candidate route in the set of candidate routes, determining, by the one or more processors, whether the road segment includes an area where precipitation is likely to accumulate;
    wherein selecting, by the one or more processors, the route from the set of candidate routes comprises selecting the route further based on which road segments are determined to include an area where precipitation is likely to accumulate.

5. The method of claim 1, further comprising:
    obtaining, by the one or more processors, information on a type of the vehicle; and
    wherein selecting the route from the set of candidate routes comprises selecting, by the one or more processors, the route further based on the vehicle type.

6. The method of claim 2, further comprising, after providing the set of navigation directions for presentation on the client device:
    obtaining, by the one or more processors, weather conditions in a second geographic area at least partially including the candidate routes;
    selecting, by the one or more processors, an updated route from a current location of the vehicle to the destination location based at least on (i) the road surface types of the road segments within each candidate route and (ii) the weather conditions in the second geographic area; and
    providing, by the one or more processors, a set of updated navigation directions for presentation on the client device for navigating from the current location of the vehicle to the destination location via the selected updated route.

7. The method of claim 1, wherein selecting, by the one or more processors, a route from the set of candidate routes based at least in part on the road surface types of the road segments within each candidate route includes:
for each candidate route:
assigning, by the one or more processors, a score to each road segment within the candidate route based at least in part on the road surface type of the road segment;
combining, by the one or more processors, the scores for each road segment within the candidate route to generate an overall score; and
selecting, by the one or more processors, the route from the set of candidate routes according to the overall score for each respective candidate route.

8. The method of claim 7, wherein assigning a score to each road segment includes:
assigning, by the one or more processors, a score to each road segment within the candidate route based at least in part on the road surface type of the road segment and on the weather conditions in the geographic area.

9. The method of claim 7, wherein assigning a score to each road segment includes:
assigning, by the one or more processors, a score to each road segment within the candidate route based on an estimated amount of time for traversing the road segment; and
adjusting, by the one or more processors, the score for each road segment based on the road surface type for the road segment.

10. The method of claim 1, further comprising:
obtaining, by the one or more processors, an image of a geographic area including the starting location and the destination location;
identifying, by the one or more processors, a set of visual features from the image of the geographic area; and
applying, by the one or more processors, the set of visual features to the machine learning model to identify one or more road surface types and corresponding locations of the road surface types within the geographic area.

11. The method of claim 10, wherein the set of navigation directions are provided within a map display of the geographic area, the map display represented with vector graphics data, and further comprising:
generating, by the one or more processors, a raster image of the geographic area annotated with identified road surface types at the corresponding locations;
converting, by the one or more processors, the corresponding locations of the road surface types within the raster image to vector graphics data; and
comparing, by the one or more processors, the converted locations represented with vector graphics data to the map display to identify a road segment corresponding to each road surface type within the geographic area.

12. The method of claim 10, wherein the determined road surface type is at least one of: dirt, asphalt, concrete, grass, gravel, brick, cobblestone, or a bridge underpass.

13. A computing device for generating a set of navigation directions according to road surface types of road segments, the computing device comprising:
one or more processors; and
a non-transitory computer-readable memory coupled to the one or more processors and storing instructions thereon that, when executed by the one or more processors, cause the computing device to:
train a machine learning model for identifying road surface types of road segments using (i) a plurality of images of road segments, and (ii) indications of road surface types for each of the plurality of images of road segments;
receive a request for navigation directions for a vehicle from a starting location to a destination location;
identify a set of candidate routes for navigating from the starting location to the destination location;
for each road segment within each candidate route in the set of candidate routes, determine a road surface type for the road segment, wherein the road surface type for at least one of the road segments is determined by:
applying visual features of the road segment to the trained machine learning model;
select a route from the set of candidate routes based at least in part on the road surface types of the road segments within each candidate route; and
provide a set of navigation directions for navigating from the starting location to the destination location via the selected route.

14. The computing device of claim 13, wherein the instructions further cause the computing device to:
obtain weather conditions in a geographic area at least partially including the candidate routes; and
select the route from the set of candidate routes based on (i) the road surface types of the road segments within each candidate route and (ii) the weather conditions in the geographic area.

* * * * *